United States Patent [19]

Hiiro et al.

[11] Patent Number: 6,103,837
[45] Date of Patent: *Aug. 15, 2000

[54] RANDOM SILOXANE COPOLYMER, PROCESS FOR PRODUCTION THEREOF, AND RESIN COMPOSITION CONTAINING THE COPOLYMER

[75] Inventors: Tomoki Hiiro; Hirosuke Kawabata, both of Kobe; Katsuhiko Kimura, Akashi; Haruo Tomita, Kobe, all of Japan

[73] Assignee: Kanegafuchi Kagaku Kogyo Kabushiki Kaisha, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/973,588
[22] PCT Filed: Jun. 4, 1996
[86] PCT No.: PCT/JP96/01503
   § 371 Date: Feb. 26, 1998
   § 102(e) Date: Feb. 26, 1998
[87] PCT Pub. No.: WO96/39460
   PCT Pub. Date: Dec. 12, 1996

[30] Foreign Application Priority Data

| Jun. 6, 1995 | [JP] | Japan | 7-139732 |
| Jun. 6, 1995 | [JP] | Japan | 7-139733 |
| Jun. 6, 1995 | [JP] | Japan | 7-139734 |
| Jul. 19, 1995 | [JP] | Japan | 7-183131 |

[51] Int. Cl.$^7$ .................................................. C08F 283/02
[52] U.S. Cl. ........................... 525/464; 525/474; 528/25; 528/26; 528/18; 528/19; 528/17; 528/15
[58] Field of Search ................................. 528/25, 26, 18, 528/14, 19, 17, 15; 525/464, 474

[56] References Cited

U.S. PATENT DOCUMENTS

| 5,126,495 | 6/1992 | Serni et al. ........................... 528/21 |
| 5,411,729 | 5/1995 | O'Lenick, Jr. ....................... 424/70.12 |

FOREIGN PATENT DOCUMENTS

| 0 567 655 A1 | 11/1993 | European Pat. Off. . |
| 0 595 141 A1 | 5/1994 | European Pat. Off. . |
| 62-25129 | 2/1987 | Japan . |
| 2-279724 | 11/1990 | Japan . |
| 3-106931 | 5/1991 | Japan . |
| 3-106973 | 5/1991 | Japan . |
| 5-155999 | 6/1993 | Japan . |
| 5-194697 | 8/1993 | Japan . |
| 5-214082 | 8/1993 | Japan . |
| 5-222173 | 8/1993 | Japan . |
| 5-262975 | 10/1993 | Japan . |
| 7-2999 | 1/1995 | Japan . |

OTHER PUBLICATIONS

J.E. Curry et al., *Journal Of Applied Polymer Science*, vol. 9, pp. 295–311 (1965) "Silane Polymers of Diols".

C.E. Carraher, Jr. et al., *Journal Of Applied Polymer Science: Part A–1*, vol. 8, pp. 973–978 (1970), "Production of Organometallic Polymers by the Interfacial Technique. V. Partial Mechanisitic Study of the Production of Poly[alkyl(aryl)oxysilanes]".

*Primary Examiner*—David W. Wu
*Assistant Examiner*—Caixia Lu
*Attorney, Agent, or Firm*—Fish & Neave

[57] ABSTRACT

The present invention relates to a siloxane random copolymer having a repeating unit represented by the following general formula (I) (II) and (III) at random and a resin composition containing the same.

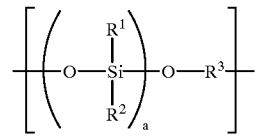

[general formula I]

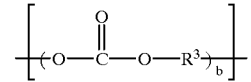

[general formula II]

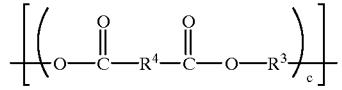

[general formula III]

Further, the invention relates to a process of producing a siloxane copolymer comprising the step of reacting at least one polycarbonate and/or dicarbonate of diol and, if needed, at least one diester of dicarboxylic acid with at least one specified silicon compound in the presence of an esterifying or ester exchange catalyst.

22 Claims, 5 Drawing Sheets

RANDOM SILOXANE COPOLYMER, PROCESS FOR PRODUCTION THEREOF, AND RESIN COMPOSITION CONTAINING THE COPOLYMER

TECHNICAL FIELD

This invention relates to a new siloxane copolymer and resin composition containing the same. Further, this invention relates to a new process of producing a siloxane copolymer.

BACKGROUND ARTS

A thermoplastic resin is a useful industrial material being used for a molded plastic article, film, fiber, adhesion, paint, an extruded sheet and the like. Generally such a thermoplastic resin is superior in light weight, impact resistance, abrasion resistance, electrical insulating property and moldability. Further, there is a transparent thermoplastic resin. However, such a thermoplastic resin has weak points in that the mechanical strength, heat resistance and weather resistance are not enough and its flammability is high and further it produces a harmful gas in combustion.

In recent years, in addition to a current general-purpose plastics, engineering plastics, which have high strength and rigidity and high heat resistance to 100° C. or more, have been developed and have been widely used as industrial materials replacing metal. Generally, the high heat resistance of these engineering plastics is realized by the fact that they have a rigid structure originating from a main chain of phenylene groups; however, they have a problem in that the moldability, which is a characteristic of a plastic, has been lost.

Since thermoplastic resins, except polyvinyl chloride and some engineering plastics, are easy to burn, it is generally made fire-retardant by adding a fire retardant, typically a halogen compound, when fire-retardance is required. However, there are problems in a halogen fire retardants, such as that it produces a more harmful gas than the thermoplastic resin itself when it is combusted and it sometimes occurs that the mechanical strength may decrease dependent on the amount of it added.

As a means to improve moldability and fire-retardance of a thermoplastic resin, a method in which a siloxane compound is added to a thermoplastic resin has been proposed. However, when the compatibility between a siloxane compound and a thermoplastic resin is low in this method, there are problems that moldability and fire-retardance may not be sufficient or the siloxane compound may bleed on the surface of a molded products of a thermoplastic resin.

As means to solve the above-mentioned problems, a technology based on siloxane copolymers has been proposed. For example, in Japanese Laid-Open Publication No. 5-262975, fire retardant polycarbonate-siloxane block copolymer has been proposed. In Japanese Laid-Open Publication No. 5-222173 and Japanese Laid-Open Publication No. 7-2999, polyester (polyester carbonate)-siloxane block copolymer has been proposed. Furthermore, in Japanese Laid-Open Publication No. 5-155999, polycarbonate having polysiloxane as a side chain has been proposed. However, it is inevitable in these siloxane copolymers that the mechanical strength decreases due to a phase separation when the introduced amount of siloxane units increases, because the siloxane units may form a block. Therefore there is a limit to the amount of siloxane units introduced, and there may be the problems that sufficient fire retardance and moldability are not obtained.

As a means to solve problems of the siloxane block copolymer, a technology based on a siloxane alternating copolymer has been proposed. For example, Curry et al. has reported a synthetic method for a siloxane copolymer obtained from a diol and bis(anilino)diphenylsilane (J. Appl. Polym. Sci., vol. 9, pp. 295 (1965)). Carraher, Jr. et al. has reported a synthetic method of a siloxane copolymer obtained from diol and dichlorodiorganosilane (J. Polym. Sci., part A-1, vol. 8, pp. 973 (1970)). In these methods, it becomes possible to increase the introduced amount of siloxane because a polymer produced becomes an alternating copolymer. However, since an expensive specific silicon compound is used in these methods, the production cost becomes high and further there is a problem that it takes a long time for the reaction.

The present invention has been developed in order to solve the above-mentioned problems, and its purpose is to overcome the usual weak points of the above-mentioned siloxane copolymer and to offer a siloxane random copolymer which is superior in fire retardance, transparency, moldability, mold releasing property and surface lubricating property, and a resin composition containing the same. The subject of the invention overcomes a weak point of a producing process of the above-mentioned usual siloxane copolymer and offers a process by which these copolymers can be produced simply, easily and is economically on a commercial basis.

The present inventors have made many studies and have found that a siloxane random copolymer, which has a specific structural unit, can solve the above-mentioned problems, and have completed this invention.

DISCLOSURE OF THE INVENTION

This invention is related to a siloxane random copolymer having a repeating unit represented by (I) (II) and (III) at random:

[general formula I]

wherein: a is 1 or 2; $R^1$ and $R^2$ are independently a hydrogen atom or a hydrocarbon group of carbon number 1–20, wherein some or all of the hydrogen atoms in theses hydrocarbon groups can be substituted with halogen atoms independently; $R^3$ is a divalent hydrocarbon group of carbon number 1–20, wherein a part or a whole of hydrogen atoms in these hydrocarbon groups can be substituted with halogen atoms independently, or the group represented by —$R^5$—X—$R^6$— wherein each of $R^5$ and $R^6$ is a divalent aromatic hydrocarbon group and a hydrogen atom on its aromatic ring may be substituted with a halogen atom, a hydrocarbon group, alkoxy group or phenoxy group independently; X is single bond, —O—, —S—, —SO—, —$SO_2$—, —CO— or a divalent hydrocarbon group of carbon number 1–20;

[general formula II]

wherein: b is 0 or 1, provided that if c in the general formula III is 0, then b is 1; $R^3$, is the same as defined above;

[general formula III]

wherein: c is 0 or 1, provided that if b in the general formula II is 0, then c is 1; $R^3$ is the same as defined above; $R^4$ is a divalent hydrocarbon group of carbon number 1–20 wherein some or all of the hydrogen atoms in these hydrocarbon groups can be substituted with halogen atoms independently, or a group represented by —$R^5$—X—$R^6$— wherein $R^5$ and $R^6$ are the same as defined above; X is the same as defined above.

In a preferred embodiment, the above-mentioned copolymer has the structural unit represented by the below described formula (IV) and each structural unit of the above-mentioned copolymer can be the same or different:

[general formula IV]

wherein: a is the same as defined above; d is 0 or 1; l is an integer of one or more; m is an integer of one or more; n is an integer of one or more; $R^1$, $R^2$, $R^3$ and $R^4$ are the same as defined above.

In a preferred embodiment, the weight average molecular weight of the above-mentioned copolymer is in a range of 2000–300000.

In a preferred embodiment, $R^1$ and $R^2$ are a methyl group or a phenyl group independently.

In a preferred embodiment, $R^3$ is a group derived from 2,2-bis(4-hydroxyphenyl)propane or 1,1-bis(4-hydroxyphenyl)-3,3,5-trimethylcyclohexane.

In a preferred embodiment, $R^4$ is a group derived from a dicarboxylic acid selected from terephthalic acid, isophthalic acid, 1,4-naphthalene dicarboxylic acid, 1,5-naphthalene dicarboxylic acid, 2,6-naphthalene dicarboxylic acid, 2,7-naphthalene dicarboxylic acid, 1,4-cyclohexane dicarboxylic acid, 1,3-cyclohexane dicarboxylic acid, 1,2-cyclohexane dicarboxylic acid, 1,4-decahydronaphtalene dicarboxylic acid, 1,5-decahydronaphtalene dicarboxylic acid, 2,6-decahydronaphtalene dicarboxylic acid, 2,7-decahydronaphtalene dicarboxylic acid.

Furthermore, the invention relates to a fire retardant resin composition containing the above-mentioned siloxane copolymer.

Furthermore, the invention relates to a resin composition for molding containing the above-mentioned siloxane copolymer Further, the invention relates to a process of producing a siloxane copolymer by reacting at least one polycarbonate and/or dicarbonate of a diol with at least one silicon compound in the presence of an esterifying or ester exchange catalyst, wherein the silicon compound can be represented by the general formulas (V) and/or (VI):

[general formula V]

[general formula VI]

wherein: e is an integer of 0–5000; f is an integer of 3–20; $R^7$, $R^8$, $R^9$ and $R^{10}$ are a hydrogen atom or a substituted or non-substituted organic group independently; Y and Z are a hydrogen atom or a substituted or non-substituted organic group independently.

In a preferred embodiment, the above-mentioned polycarbonate is represented by a general formula (VII):

[general formula VII]

wherein: g is an integer of 10000 or less; $R^3$ is the same as defined above.

In a preferred embodiment, the dicarbonate of the diol is represented by a general formula (VIII):

[general formula VIII]

wherein: $R^3$ is the same as defined above; $R^{11}$ is a hydrocarbon group of carbon number 1–20.

In a preferred embodiment, at least one diester of a dicarboxylic acid represented by the general formula (IX) is reacted:

[general formula IX]

wherein: $R^4$ is the same as defined above; $R^{11}$ is the same as defined above.

In a preferred embodiment, the above-mentioned silicon compound is selected from the group consisting of polydimethylsiloxane, polymethylphenylsiloxane, dimethoxydimethylsilane, dimethoxydiphenylsilane, octamethylcyclotetrasiloxane and octaphenylcyclotetrasiloxane.

In a preferred embodiment, the above-mentioned polycarbonate is polycarbonate of 2,2-bis(4-hydroxyphenyl) propane.

In a preferred embodiment, the dicarbonate of the diol is selected from the group consisting of bis(methyl carbonate)

of 2,2-bis(4-hydroxyphenyl)propane and bis(phenyl carbonate) of 2,2-bis(4-hydroxyphenyl)propane.

In a preferred embodiment, the above-mentioned diester of a dicarboxylic acid is selected from the group consisting of dimethyl terephthalate, dimethylisophthalate and dimethyl-2,6-naphthalene dicarbonxylate.

In a preferred embodiment, the above-mentioned esterifying or ester exchange catalyst is a tin compound.

In a preferred embodiment, the above-mentioned esterifying or ester exchange catalyst is at least one selected from the group consisting of an acetate, a carbonate, a borate, an oxide, a hydroxide, a hydride, an alkolate and phenolate of lithium, sodium, potassium, magnesium, calcium, barium, strontium, zinc, cadmium, titanium, zirconium, tin, antimony, lead, manganese and cobalt.

In a preferred embodiment, 0.0001–1 parts by weight of the above-mentioned esterifying or ester exchange catalyst is used to 100 parts by weight of the above-mentioned producing siloxane copolymer.

BEST MODE FOR CARRYING OUT THE INVENTION

Hereinafter the present invention will be described in detail.

In this specification, the chemical structures represented by the above general formula (I) (II) and (III) are referred to as a repeating unit and the chemical structure represented by the above general formula (IV) wherein n is 1 referred to as a structural unit.

The siloxane random copolymer of the invention has a repeating unit represented by the above-described general formula (I) (II) and (III) at random.

The siloxane random copolymer of the invention can be represented more clearly by the general formula (IV):

[general formula IV]

and can contain one or more structural units and further, a, l, m and n in the structural unit represented by the general formula (IV) can be the same or different. d in each structural unit may be 0 or 1. In other words each repeating unit in a copolymer exists at random.

$R^1$ and $R^2$ in the repeating unit shown by the above-mentioned general formula (I) are a hydrogen atom or a hydrocarbon group of carbon number 1–20 independently (some or all of the hydrogen atoms in these hydrocarbon groups can be substituted with halogen atoms independently), and $R^1$ and $R^2$ in the copolymer may be the same or different. Examples of $R^1$ and $R^2$ in the copolymer include methyl, ethyl, n-propyl, isopropyl, n-butyl, tert-butyl, n-penthyl, n-hexyl, phenyl, naphthyl, allyl, vinyl, chloromethyl, 3,3,3-trifluoropropyl, perfluorobutyl, perfluorooctyl groups and the like. Among these, the methyl, ethyl, phenyl and naphthyl groups are preferred and the methyl and phenyl groups are particularly preferred.

$R^3$ in the repeating unit represented by the above-described general formula (I) (II) and (III) is either a divalent hydrocarbon group of carbon number 1–20 (some or all of the hydrogen atoms in these hydrocarbon groups can be substituted with halogen atoms independently) or a group represented by —$R^5$—X—$R^6$— (each of $R^5$ and $R^6$ is a divalent aromatic hydrocarbon group, and a hydrogen atom on the aromatic ring may be substituted with a halogen atom, a hydrocarbon group, alkoxy group or phenoxy group independently; X is a single bond, —O—, —S—, —SO—, —$SO_2$—, —CO— or a divalent hydrocarbon group of carbon number 1–20), and the $R^3$ groups in the copolymer may be the same or different. Examples of $R^3$ in the copolymer include groups derived from an aromatic diol such as 2,2-bis(4-hydroxyphenyl)propane (bisphenol A), bis(4-hydroxyphenyl)methane, 1,1-bis(4-hydroxyphenyl)-3,3,5-trimethylcyclohexane (bisphenol TMC), bis(4-hydoxy-3,5-dimethylphenyl)methane, bis(4-hydoxy-3,5-dichlorophenyl)methane 1,1-bis(4-hydroxyphenyl) cyclohexylmethane, 1,1-bis(4-hydroxyphenyl)ethane, 1,1-bis(4-hydroxyphenyl)-1-phenylethane, 4,4'-dihydroxydiphenylether, bis(4-hydroxy-3,5-dimethylphenyl)ether, bis(4-hydroxyphenyl)sulfone, bis(4-hydroxy-3,5-dimethylphenyl)sulfone, 4,4'-dihydroxybenzophenone, 2,2-bis(4-hydroxy-3,5-dimethylphenyl)propane, tetrabromobisphenol A, tetrachlorobisphenol A, dihydroxydiphenyl, hydroquinone, resorcinol, dihydroxynaphthalene, dihydroxyanthracene, phenolphthalein, fluorescein, 2,2'-dihydroxy-1,1-dinaphthylmethane, 4,4'-dihydroxydinaphthyl and the like, an aliphatic diol such as ethylene glycol, propylene glycol, butylene glycol, hexylene glycol and the like and an alicyclic diol such as cyclohexanedimethanol. Among these, the groups derived from bisphenol A, bisphenol TMC, 2,2-bis (4-hydroxy-3,5-dimethylphenyl)propane and bis(4-hydroxyphenyl)sulfone are preferred, the groups derived from bisphenol A and bisphenol TMC are especially preferred.

$R^4$ in the repeating unit represented by the above-described general formula (III) is a divalent hydrocarbon group of carbon number 1–20 (some or all of the hydrogen atoms in these hydrocarbon groups can be substituted with halogen atoms independently) or a group represented by —$R^5$—X—$R^6$— (each of $R^1$ and $R^6$ is a divalent aromatic hydrocarbon group, and a hydrogen atom on its aromatic ring may be substituted with a halogen atom, a hydrocarbon group, alkoxy group or phenoxy group independently; X is a single bond, —O—, —S—, —SO—, —$SO_2$—, —CO— or a divalent hydrocarbon group of carbon number 1–20), and $R^4$ in the copolymer may be the same or different. Examples of $R^4$ in the copolymer include a group derived from an aromatic dicarboxylic acid such as terephthalic acid, isophthalic acid, phthalic acid, diphenyl ether-4,4'-dicarboxylic acid, benzophenone-4,4'-dicarboxylic acid, 1,4-naphthalenedicarboxylic acid, 1,5-naphthalenedicarboxylic acid, 2,6-naphthalenedicarboxylic acid and 2,7-naphthalenedicarboxylic acid, an aliphatic dicarboxylic acid such as oxalic acid, malonic acid, succinic acid and glutaric acid or an alicyclic dicarboxylic acid such as 1,4-cyclohexane dicarboxylic acid, 1,3-cyclohexane dicarboxylic acid, 1,2-cyclohexane dicarboxylic acid, 1,4-decahydronaphthalenedicarboxylic acid, 1,5-decahydronaphthalenedicarboxylic acid, 2,6-decahydronaphthalenedicarboxylic acid and 2,7-decahydronaphthalenedicarboxylic acid. Among these, a group derived from terephthalic acid, isophthalic acid, 1,4-cyclohexane dicarboxylic acid and 2,6-naphthalenedicarboxylic acid is preferred, and a group derived from terephthalic acid and isophthalic acid is especially preferred.

A method for producing the siloxane random copolymer of the invention includes but is not limited to a known polymerization method, for example, a melt condensation polymerization method, a solution condensation polymerization method and an interfacial condensation polymerization method. For example, the siloxane random copolymer of the invention can be produced by an ester exchange method using polycarbonate (and/or dicarbonate of diol), diester of dicarboxylic acid and siloxane compound as a starting material; a direct condensation polymerization method using diol, dicarboxylic acid and a siloxane compound as a starting material; an acetic acid method using a diol, dicarboxylic acid, acetic anhydride and a siloxane compound as a starting material; a phenol method using a diol, a diphenyl ester of a dicarboxylic acid and a siloxane compound as a starting material. In this case, through suitably adjusting the charge ratio of the reactants, reaction conditions and the like, a polyester-siloxane random copolymer can be produced by reacting the carbonate moiety completely, and the polyester carbonate-siloxane random copolymer can be produced by reacting carbonate moiety not completely.

The siloxane random copolymer of the invention can be produced preferably by the above-described ester exchange reaction among the above-mentioned polymerization methods and more preferably by the process for producing a siloxane copolymer of the invention as described later.

In the siloxane random copolymer of the invention, a weight average molecular weight is preferably in a range of 2000–300000. The high molecular weight forms of this copolymer are useful as the chief ingredient of a fire retardant resin composition or a resin composition for molding and the low molecular weight forms are useful as a fire retardant to improve the fire retardance of other resins.

In order to obtain good properties as a fire retardant resin or a resin for molding, the weight average molecular weight is preferably in a range of 10000–300000, and more preferably in the range of 20000–100000, and the most preferably in the range of 40000–80000, when the siloxane random copolymer of the invention is used as the chief ingredient of a fire retardant resin composition or molding resin composition. When it is less than 10000, many cases in which the mechanical properties are not adequate often occur, and many cases in which the moldability is not adequate often occur when it exceeds 300000. In this case, a "chief ingredient" means a major contained ingredient in a composition, and it means that the siloxane random copolymer of the invention is contained at least 30% by weight and more preferably at least 50% by weight in the composition.

On the other hand, in order to improve fire retardance of other resins, a suitable amount of the siloxane random copolymer of the invention as an additive, 1% to 30% by weight, preferably 10% by weight to 20% by weight, may be contained in a composition when the siloxane random copolymer of the invention is used as a fire retardant for a resin composition. In this case, the weight average molecular weight of the siloxane random copolymer of the invention is preferably in the range of 2000–100000, and more preferably 2000–60000, and the most preferably 5000–40000. When it is less than 2000, the mechanical property of the resin composition becomes unsatisfactory, and the moldability of the resin composition becomes unsatisfactory when it exceeds 100000.

The fire retardant resin composition and the resin composition for molding according to the invention contain the siloxane random copolymer of the invention. The fire retardant resin composition of the invention may contain a siloxane random copolymer as a chief ingredient or as a fire retardant. The preferable content of a siloxane random copolymer in the fire retardant resin composition and the resin composition for molding of the invention is the same as described above. The fire retardant resin composition and the resin composition for molding of the invention can contain a known resin, additive and the like.

A known resin includes a thermoplastic resin, a thermosetting resin, an elastomer and the like. Examples of these include polydienes such as polybutadiene, polyisoprene and the like, polyalkenes such as polyethylene, polypropylene, polyisobutylene and the like, poly(meth)acrylates such as polyacrylic acid, polymethylmethacrylate, polybutylacrylate and the like, copolymers of (meth)acrylic acid(ester) monomer, styrene monomer and acrylonitrile monomer, polyacrylamides, polyvinylethers, polyvinylalcohols, polyvinylhalides such as polyvinylchloride and the like, polyvinylesters, polystyrenes, polyoxides such as polyoxymethylene, polyoxypropylene and the like, polyamides such as nylon 6, nylon 6-6 and the like, polyamines, polyacetals, polyaramides, polycarbonates, polyesters such as polyethylene terephthalate, polybutylene terephthalate, polyarylates, a liquid crystalline polymer of polyester and the like, polyurethanes, polyphenyleneoxides, polyphenylenesufides, polysulfones, polyethersulfones, polyetherimides, polyamideimides, polyimides, polyetheretherketones, polysiloxanes, ethylene-propylene copolymers, copolymers of ethylene-propylene-diene monomers, a modified polyolefin grafted with a polar group such as maleic anhydride, glycidylmethacrylate and the like, acrylic elastomer, butadiene rubber modified styrene-acrylonitrile copolymer, thermoplastic elastomer of a modified styrene grafted with a polar monomer such as maleic anhydride, glycidylmethacrylate and the like, phenolic resin, epoxy resin, unsaturated polyester resin and the like. Among these, a copolymer of (meth)acrylic acid (ester) monomer, styrene monomer and acrylonitrile monomer, a polyamide, polycarbonate, polyethylene terephthalate and polybutylene terephthalate are preferred, and a copolymer of (meth)acrylic acid (ester) monomer, styrene monomer and acrylonitrile monomer, polycarbonate and polybutylene terephthalate are more preferred. These can be contained alone or in combination with each other in a composition.

Examples of the above-mentioned additive include antioxidant, an ultra-violet absorbent, lubricant, a plasticizer, dye, a pigment, other fire retardant, filler, reinforcing materials (for example, glass fibers, carbon fibers etc.) and other auxiliaries. An adding amount is suitably determined depending on the purpose of using it. These additives can be added either before polymerization, during polymerization or after polymerization.

The siloxane random copolymer, the fire retardant resin composition and the resin composition for molding of the invention can be used for production, such as, a plastic molded product, film, fiber, adhesive, paint, extruding sheet and the like.

The siloxane random copolymer, the fire retardant resin composition and the resin composition for molding of the invention can molded into any article by known methods. Molding methods include but are not limited to an injection molding method, a compression molding method, an extrusion molding method and blow molding method.

The siloxane random copolymer, the fire retardant resin composition and the resin composition for molding of the invention have superior fire retardance, transparency, moldability, mold release property and surface lubricating property due to the copolymer itself, in addition to heat resistance, toughness, anti-hydrolysis and mechanical property. Accordingly the siloxane random copolymer, the fire retardant resin composition and the resin composition for molding of the invention are suitable, for example, for an article in the fields of electricity, illumination and cars. The siloxane random copolymer, the fire retardant resin composition and the resin composition for molding of the invention can be used for an electric/electronic parts material for such as a relay case, a switch, a connector, a cover, housing materials and the like, illumination parts materials for such as a lamp shade, lenses and the like, automobile parts materials for such as headlight lens, inner cap, a reflector and the like. Furthermore, the siloxane copolymer obtained by the process of producing a siloxane copolymer of the invention mentioned later can be used in the similar fields as described above.

Since the siloxane copolymer of the invention has a random type structure of a repeating unit in the structural unit represented by the above-described general formula (IV), it can become possible not only that introduction of a large amount of a siloxane unit can be realized but also that high fire retardance and superior moldability can be realized as well as keeping its mechanical property and heat resistance. While there is a limit to the amount of a siloxane unit introduced into a block type siloxane copolymer, and decreasing of mechanical strength can not be avoided due to a phase separation, this type copolymer has a defect that a fire retardance can not be improved as much as expected. Accordingly, the siloxane random copolymer of the invention is superior in fire retardance compared with a block type siloxane copolymer.

Next, a preferred embodiment of a process for producing a siloxane copolymer of the invention will be described.

The process for producing a siloxane copolymer of the invention comprises the step of reacting at least one polycarbonate and/or dicdicarbonate of a diol with at least one specified silicon compound in the presence of an esterification or ester exchange catalyst.

The silicon compound can be represented by the above-mentioned general formula (V) and/or (VI). In the general formula (V) and (VI), $R^7$, $R^8$, $R^9$ and $R^{10}$ are independently a hydrogen atom or a substituted or unsubstituted organic group. Y and Z are independently a hydrogen atom or a substituted or unsubstituted organic group. e is an integer of 0–5000, preferably 0–100, and f is an integer of 3–20, preferably 3–4. Examples of the substituted or unsubstituted organic group include a hydrocarbon group of carbon number 1–20 (some or all of the hydrogen atoms in these hydrocarbon groups can be substituted independently with at least one group selected from a group consisting of a hydroxyl group, a halogen atom, an alkoxy group, a phenoxy group, an amino group, a group containing an ammonium salt, an alkyl amino group, a carboxyl group, an ester group, a polyether group, an epoxy group, a vinyl group, a vinylether group, a vinylester group, an allyl group, an acryl group, a methacrylic group, a mercapto group, an isocyanate group), a hydroxyl group, a halogen atom, an alkoxy group, a phenoxy group, an amino group, a group containing an ammonium salt, an alkylamino group, a carboxyl group, an ester group, a polyether group, an epoxy group, a vinyl group, a vinylether group, a vinylester group, an allyl group, an acryl group, a methacrylic group, a mercapto group, an isocyanate group and the like. Among these, a hydrocarbon group such as a methyl, a phenyl group and the like, an alkoxy group such as a methoxy, an ethoxy and the like and phenoxy groups are preferred, especially the methoxy and ethoxy groups are preferred.

Examples of the above-mentioned silicon compounds include an alkoxy silane such as dimethoxydimethylsilane, diethoxydimethylsilane, octadecyltrimethoxysilane, octadecyltriethoxysilane, octadecylmethyldimethoxysilane, vinylmethyldiethoxysilane, vinyltrimethoxysilane, vinyl triethoxysilane, 5-hexenyltrimethoxysilane, methylphenyldimethoxysilane, methylphenyldiethoxysilane, diphenyldimethoxysilane, diphenyldiethoxysilane, phenyltrimethoxysilane, phenyltriethoxysilane, cyclohexylmethyldimethoxysilane, N-(2-aminoethyl)-3-aminopropyl methyldimethoxysilane, 3-aminopropyltriethoxysilane, 3-chloropropylmethyldimethoxysilane, (3-glycidoxypropyl) methyldiethoxysilane and 3-methacryloxypropylmethyldimethoxysilane, a phenysilane such as diphenyisilane and diphenylsilane diol, a cyclic siloxane such as hexamethylcyclotrisiloxane, hexaphenylcyclo-trisiloxane, octamethylcyclotetrasiloxane, octaphenylcyclotetrasiloxane, 1,3,5,7-tetramethylcyclotetrasiloxane, 1,3,5,7-tetravinyltetramethyl-cyclotetrasiloxane and decamethylcyclopentasiloxane, and polysiloxane such as hexamethyldisiloxane, octamethyltrisiloxane, decamethyltetrasiloxane, dodecamethylpentasiloxane, tetradecamethylhexasiloxane, hexadecamethytheptasiloxane, octadecamethyloctasiloxane, eicosamethylnonasiloxane, docosamethyldecasiloxane, 3,3-diphenylhexamethyltrisiloxane, siloxane oligomer, polydimethylsiloxane, polymethylphenylsiloxane, polydiphenylsiloxane, polysiloxane having alkyl groups, polysiloxane having methacrylic groups, polysiloxane having chloroalkyl groups, polysiloxane having fluorines, polysiloxane having polyethers, polysiloxane having alcohols, polysiloxane having amino groups, polysiloxane having epoxy groups, polysiloxane having phenols, polysiloxane having carboxy groups, polysiloxane having mercapto groups and the like. These silicon compounds may be used alone or in combination with each other.

Among these, polydimethylsiloxane, polymethylphenylsiloxane, dimethoxydimethylsilane, dimethoxydiphenylsi lane, octamethylcyclotetrasiloxane and octaphenylcyclotetrasiloxane are preferred, and polydimethylsiloxane, dimethoxydimethylsilane and octamethylcyclotetrasiloxane are more preferred.

A polycarbonate is preferably represented by the above-described general formula (VII). $R^3$ in the general formula (VII) is a divalent hydrocarbon group of carbon number 1–20 (some or all of the hydrogen atoms in these hydrocarbon groups can be substituted with halogen atom independently) or the group represented by —$R^5$—X—$R^6$— (each of $R^5$ and $R^6$ is a divalent aromatic hydrocarbon group, and a hydrogen atom on its aromatic ring may be substituted with a halogen atom, a hydrocarbon group, alkoxy group or phenoxy group independently; X is a single bond, —O—, —S—, —SO—, —SO$_2$—, —CO— or a divalent hydrocarbon group of carbon number 1–20); g is an integer of 10000 or less, more preferably 10–1000.

Examples of the above polycarbonates include the polycarbonates derived from the following diols: an aromatic diol such as 2,2-bis(4-hydroxyphenyl)propane (bisphenol A), bis(4-hydroxypheny)methane, bis(4-hydroxy-3,5-dimethylphenyl)methane, bis(4-hydroxy-3,5-dichlorophenyl)methane, 1,1-bis(4-hydroxypheny) cyclohexylmethane, 1,1-bis(4-hydroxyphenyl)ethane, 1,1-bis(4-hydroxyphenyl)-1-phenylethane, 1,1-bis(4-hydroxyphenyl)-3,3,5-trimethylcyclohexane (bisphenol TMC), 4,4'-dihydroxy-diphenylether, bis(4-hydroxy-3,5-dimethylphenyl)ether, bis(4-hydroxy-phenyl)sulfone, bis(4-hydroxy-3,5-dimethylphenyl)sulfone, 4,4'-dihydroxybenzophenone, 2,2-bis(4-hydroxy-3,5-dimethylphenyl)propane, tetrabromobisphenol-A, tetrachlorobisphenol A, dihydroxydiphenyl, hydroquinone, resorcinol, dihydroxynaphtalene, dihydroxyanthracene, phenolphthalein, fluorescein, 2,2'-dihydroxy-1,1-dinaphthylmethane and 4,4'-dihydroxydinaphtyl, and an aliphatic diol such as ethylene glycol, propylene glycol, tetramethylene glycol, diethylene glycol, triethylene glycol, polyethylene glycol, 1,3-propane diol, 1,2-propane diol, 1,4-buthane diol, 1,3-buthane diol, 1,2-buthane diol, 1,6-hexane diol and 1,10-decane diol. These polycarbonate may be used alone or in combination with each other.

Among the polycarbonates used for the invention, the polycarbonate derived from bisphenol A and bisphenol TMC are preferred, and the polycarbonate derived from bisphenol A is more preferred.

Dicarbonates of diols are preferably represented by the above-mentioned general formula (VIII). $R^3$ in the general formula (VIII) is the same as defined in the general formula (VII). $R^{11}$ is a hydrocarbon group of carbon number 1–20. $R^{11}$ can be the same or different.

Examples of the dicarbonate of diols include bis (methylcarbonate), bis(ethylcarbonate), bis (propylcarbonate), bis(butylcarbonate), bis (cyclohexylcarbonate), bis(phenylcarbonate), and bis (methylphenylcarbonate) derived from an aromatic diol such as 2,2-bis(4-hydroxypheny)propane (bisphenol A), bis (4-hydroxypheny)methane, bis(4-hydroxy-3,5-dimethylphenyl)methane, bis(4-hydroxy-3,5-dichlorophenyl)methane, 1,1-bis(4-hydroxypheny) cyclohexyl methane, 1,1-bis(4-hydroxypheny)ethane, 1,1-bis(4-hydroxypheny)-1-phenylethane, 1,1-bis(4-hydroxypheny)-3,3,5-trimethylcyclohexane (bisphenol TMC), 4,4'-dihydroxydiphenyl-ether, bis(4-hydroxy-3,5-dimethylphenyl)ether, bis(4-hydroxypheny)sulfone, bis(4-hydroxy-3,5-dimethylphenyl)sulfone, 4,4'-dihydroxybenzophenone, 2,2-bis(4-hydroxy-3,5-dimethylphenyl)propane, tetrabromobisphenol-A, tetrachlorobisphenol A, dihydroxydiphenyl, hydroquinone, resorcinol, dihydroxynaphtalene, dihydroxyanthracene, phenolphthalein, fluorescein, 2,2'-dihydroxy-1,1-dinaphthyl methane and 4,4'-dihydroxydinaphtyl, and an aliphatic diol such as ethylene glycol, propylene glycol, tetramethylene glycol, diethylene glycol, triethylene gylcol, polyethylene glycol, 1,3-propanediol, 1,2-propanediol, 1,4-butanediol, 1,3-butanediol, 1,2-butanediol, 1,6-hexanediol and 1,10-decanediol. The dicarbonates from these diols may be used alone or in combination with each other.

Among these dicarbonates from these diols used for the invention, a bis(methyl carbonate) from bisphenol A, a bis(phenyl carbonate) from bisphenol A, a bis(methyl carbonate) from bisphenol TMC, a bis(phenyl carbonate) from bisphenol TMC are preferred, and a bis(methyl carbonate) from bisphenol A and a bis(phenyl carbonate) from bisphenol A are more preferred.

Preferably in the process of the invention, at least one diester of a dicarboxylic acid can be reacted. This diester of dicarboxylic acid is preferably represented by the above-mentioned general formula (IX). In the general formula (IX), $R^4$ is a divalent hydrocarbon group of carbon number 1–20 (some or all of the hydrogen atoms in these hydrocarbon groups can be substituted with halogen atom, hydrocarbon group, alkoxy group, phenoxy group and the like). $R^{11}$ is the same as defined in the general formula (VIII).

Examples of the above-mentioned diesters of the dicarboxylic acids include dimethylesters, diethylesters, dipropylesters, dibutylesters, dicyclohexylesters, and diphenylesters derived from an aromatic dicarboxylic acid such as terephthalic acid, methoxyterephthalic acid, ethoxyterephthalic acid, fluoroterephthalic acid, chloroterephthalic acid, methyl terephthalic acid, isophthalic acid, phthalic acid, methoxyisophthalic acid, diphenyl methane-4,4'-dicarboxylic acid, diphenyl methane-3,3'-dicarboxylic acid, diphenyl ether-4,4'-dicarboxylic acid, diphenyl-4,4'-dicarboxylic acid, naphthalene-1,4-dicarboxylic acid, naphthalene-1,5-dicarboxylic acid, naphthalene-2,6-dicarboxylic acid and the like, an aliphatic dicarboxylic acid such as oxalic acid, malonic acid, succinic acid, glutaric acid, adipic acid, suberic acid, azelaic acid, sebacic acid, dodecanedicarboxylic acid, 3-methylazelaic acid and the like, and an alicyclic dicarxylic acid such as 1,4-cyclohexanedicarboxylic acid, 1,3-cyclohexanedicarboxylic acid, 1,2-cyclohexanedicarboxylic acid, 1,3-cyclopentanedicarboxylic acid, 1,5-decahydronaphthalenedicarboxylic acid, 2,6-decahydronaphthalene dicarboxylic acid, 2,7-decahydronaphthalene dicarboxylic acid and the like. The diesters of these dicarboxylic acids may be used alone or in combination with each other.

Among the esters of the carboxylic acids used for the invention, dimethyl terephthalate, dimethyl isophthalate, dimethyl-2,6-naphthalenedicarboxylate and dimethyl-1,4-cyclohexane dicarboxylate are preferred, and dimethyl terephthalate, dimethyl isophthalate and dimethyl-2,6-naphthalene dicarboxylate are more preferred.

As a catalyst for the process of the invention, the known esterification or ester exchange catalysts can be used. Examples of these catalysts include an acetate, a carbonate, a borate, an oxide, a hydroxide, a hydride, an alcoholate or a phenolate of an alkali metal such as lithium, sodium and potassium, an alkaline-earth metal such as magnesium, calcium, barium and strontium, a metal such as zinc, cadmium, titanium, zirconium, tin, antimony, lead, manganese and cobalt. These esterification or ester exchange catalysts may be used alone or in combination with each other.

Among these, the tin compounds are preferred, for examples, acyl tin, tetraacyl stannane, dibutyltin oxide, dibutyltin diacetate, dibutyltin laurate, dimethyltin maleate, tin dioctanoate, tin tetraacetate, stannous chloride, stannic chloride, stannous acetate, trichlorobutyltin, dichlorobutyltin, stannous oxide and stannic oxide. The amount of these catalysts is preferably in the range of 0.0001–1.0 parts by weight to 100 parts by weight of copolymer, more preferably in a range of 0.0005–0.1 parts by weight. When the amount of the catalysts is less than 0.0001 parts by weight, the reaction is not completed, while when it is more than 1.0 parts by weight, the coloration of the polymer produced becomes intense, and further, properties such as anti-hydrolysis become not inadequate.

In the invention, it is preferable that the two step reactions at different temperatures are performed. The first step reaction may be performed preferably at 150–300° C., more preferably at 200–300° C. The second step reaction may be performed preferably at 200–400° C., more preferably at 250–350° C. and under a reduced pressure (with respect to reducing pressure, it is preferable to reduce the pressure gradually and finally to 6–133 Pa). However the invention is not limited to the above-mentioned two-step reaction, and the invention may be performed at multi step including a variety of temperatures and pressures or at the same temperature throughout the reaction.

When a polycarbonate is used as the starting material in the invention, a depolymerization and ester exchange reaction of polycarbonate with silicon compound (or silicon compound and the diesters of dicarboxylic acids) occur to form a siloxane oligomer in the first step. In the second step, the ester exchange reactions proceed further to give a high molecular weight siloxane copolymer under reduced pressure.

When the dicarbonates of diols are used as the starting material instead of polycarbonates, the ester exchange reaction between the dicarbonates of diols and the silicon compounds (or silicon compound and diester of dicarboxylic acids) is occured in the first step, and a high molecular weight siloxane copolymer is produced by reducing pressure in the second step.

A variety of siloxane copolymers can be produced by adjusting the amounts of each ingredient and the reaction conditions appropriately in the process of the invention. That is, in the process of the invention, when a diester of a dicarboxylic acid is used and more than 1 mol ratio of the total sum of the diester of a dicrboxylic acid and the silicon compound is used to 1 mol of polycarbonate and/or dicarbonates of a diol (repeating unit), the carbonate moiety may be reacted completely to disappear, thereby forming a polyester-siloxane copolymer. While, when less than 1 mol ratio of the total sum of the diester of dicarbonate and the silicon compound is used to 1 mole of polycarbonate and/or the dicarbonate of a diol (repeating unit), the carbonate moiety may not be completely reacted, to remain thereby forming polyester carbonate-siloxane copolymer. Further when the diester of a dicarboxylic acid is not used and a silicon compound is used in more than 1 mol ratio to 1 mol of the polycarbonate and/or the dicarbonate of a diol (repeating unit), the carbonate moeity may be reacted completely to disappear, thereby forming polyol-siloxane copolymer. While, when a silicon compound is used in less than 1 mol ratio to 1 mol of the polycarbonate and/or the dicarbonate of a diol (repeating unit), a carbonate moeity may not be reacted completely, to remain thereby forming polycarbonate-siloxane copolymer.

In the invention, a suitable auxiliary solvent, for example, diphenyl ether, biphenyl, substituted cyclohexane, decahydronaphthalene, 1,2,4,5-tetramethylbenzene may be used. Or a non-solvent which is not compatible with a produced polymer, for example, poly(fluorinated alkylene oxide) may be used.

In the invention, when polycarbonates are reacted with polysiloxane compounds, a carbonate can coexist in order to promote the depolymerization reaction of polycarbonate. Examples of such carbonates include dimethyl carbonate, diethyl carbonate, diphenyl carbonate and the like.

The siloxane copolymer produced by the process of the invention may be molded after being pelletized (being chipped) or may be directly molded in a desired shape using an extruder.

EXAMPLES

Hereinafter, the present invention will be described in more detail by way of the following Examples, but the invention is not limited to the following Examples, and various modifications can be made without departing from the scope and spirit of the invention.

Further, the characteristics of a polymer have been measured according to the following method.
(1) Weight Average Molecular Weight (Mw) of the Polymer It was measured by a gel-permeation chromatography method (GPC), using 510 type GPC. system (Waters Company) with the conditions that chloroform as an eluent and polymer concentration of 2 mg/ml and a column temperature of 35° C. The weight average molecular weight was calculated using polystyrene as a standard sample.
(2) Glass Transition Temperature (Tg) of the Polymer It was measured by a differential scanning thermal analysis with DSC-7 (Perkin-Elmer Company) under a nitrogen gas flow at a rate of temperature increase of 20° C./minute.
(3) Silicon (Si) Atom Content in the Polymer After the polymer was heat-treated with sulfuric acid and sodium carbonate and calcium carbonate were added to it, and further it was heat-treated with an electric furnace, the silicon (Si) atom content in the polymer was measured by an emission spectrometer analysis method with ICP (Inductively Coupled Plasma).
(4) Melt Viscosity (MV) of the Polymer It was measured by using Capirograph PD-C. (Orient Seiki Proc. Co., Ltd.) at 300° C. and a shear rate of 1216 s$^{-1}$.
(5) Fire Retardance of the Polymer After having pelletized a polymer and dried at 120° C. for 15 hours under reduced pressure, a sample was made by injection molding and it was evaluated according to UL-94V standard.
(6) Transparency of the Polymer Total (luminous) transmittance (T) of a sample of ⅛ inches thickness made by an injection molding was measured by using NDH-Σ 80 (Nippon Densyoku Co.,Ltd.).

Example 1

1271 g of dried polycarbonate (repeating unit 5 mol) (Pan Light L-1250W made by Teijinn Chem.Ind. Co.,Ltd.), 486 g (2.5 mol) of dimethyl terephthalate, 486 g (2.5 mol) of dimethyl isophthalate, 444 g (repeating unit 6 mol) of polydimethylsiloxane (silicone oil KF968 made by Shin-Etsu Chemical Co., Ltd.) and 585 mg (1.7 mmol) of dibuthyltin diacetate were charged into a 14 L reaction vessel equipped with impeller agitation, a nitrogen inlet, a condenser and a distillate outlet. Degassing (60Pa)-nitrogen purges with an ultra high purity nitrogen was repeated three times, then heating under a nitrogen gas atmosphere was started. After stirring for one hour at an inner temperature 280° C., the inner temperature was raised to 300° C. and the by-produced dimethylcarbonate was distilled off. After two hours, the inner temperature was raised to 320° C., stirring was continued for two hours under the reduced pressure (26 Pa). The polymer obtained was dissolved in methylene chloride and was purified by reprecipitating the polymer through pouring the solution into a large quantity of hexane.

Figure 1:
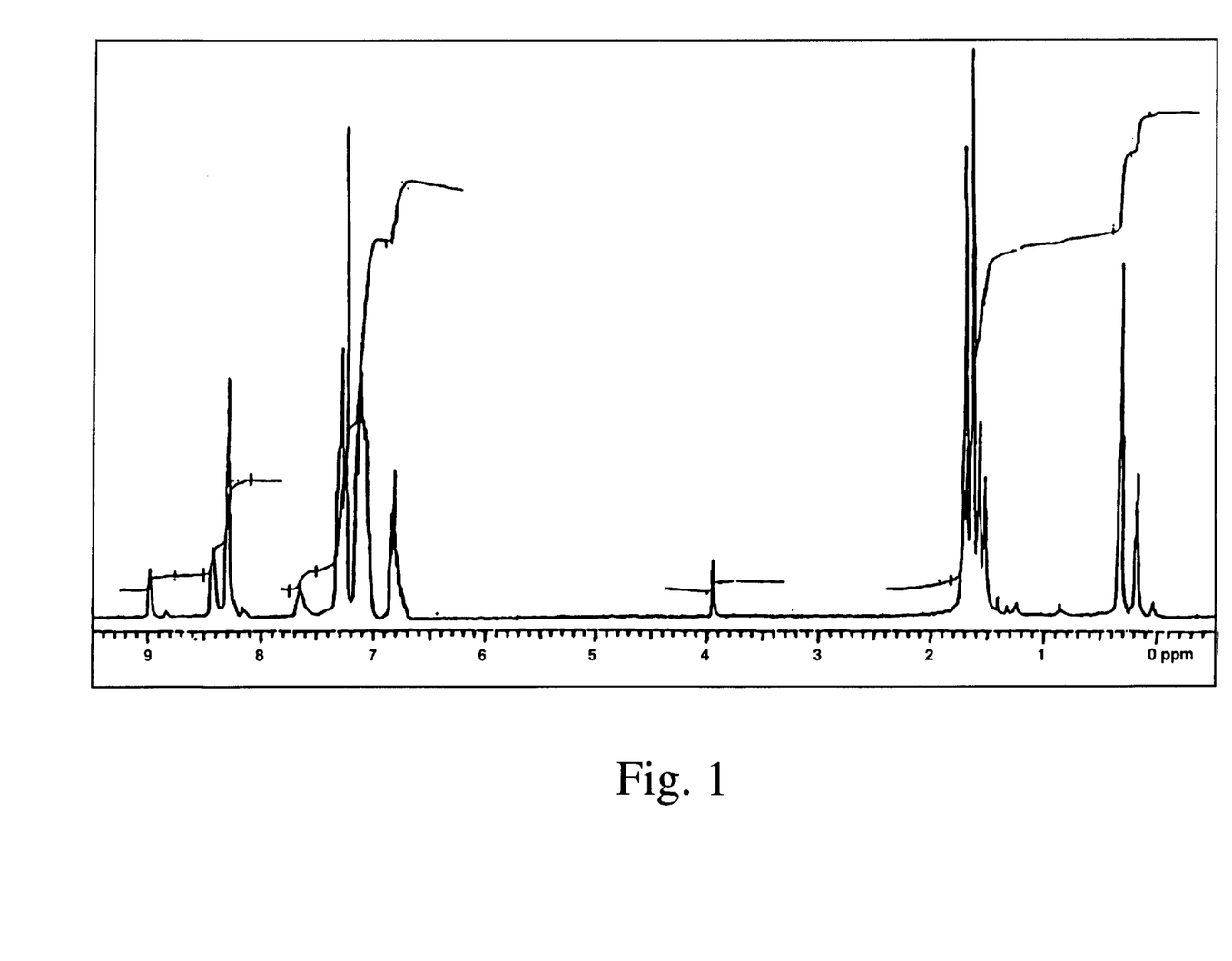
FIG. 1 is a graph showing of NMR spectrum of the polyester-siloxane copolymer obtained in Example 1.

$^1$H-NMR spectrum of the polymer obtained is shown in FIG. 1. A proton of methyl group bonded to a silicon atom of the polydimethylsiloxane as a starting material has a peak in the neighborhood of δ 0.00 ppm, while the peak based on the starting material was not found in the NMR spectrum of the polymer obtained. Instead of this, two peaks at δ 0.18 ppm and δ 0.33 ppm were confirmed. These peaks correspond to a proton of a methyl group bonded to a silicon atom in a siloxane unit wherein a=2 and a=1 respectively in the structural unit represented by the above-described general formula (IV). In other words, this fact shows that a siloxane unit did not form a block and existed at random in the polymer chain. The silicon (Si) atom content calculated from $^1$H-NMR spectrum was 3.5% by weight, while the silicon atom content obtained from ICP emission spectrometer analysis method after alkali fusion of the polymer was 3.4% by weight. Thus, it was shown that both values were almost the same.

Figure 2:
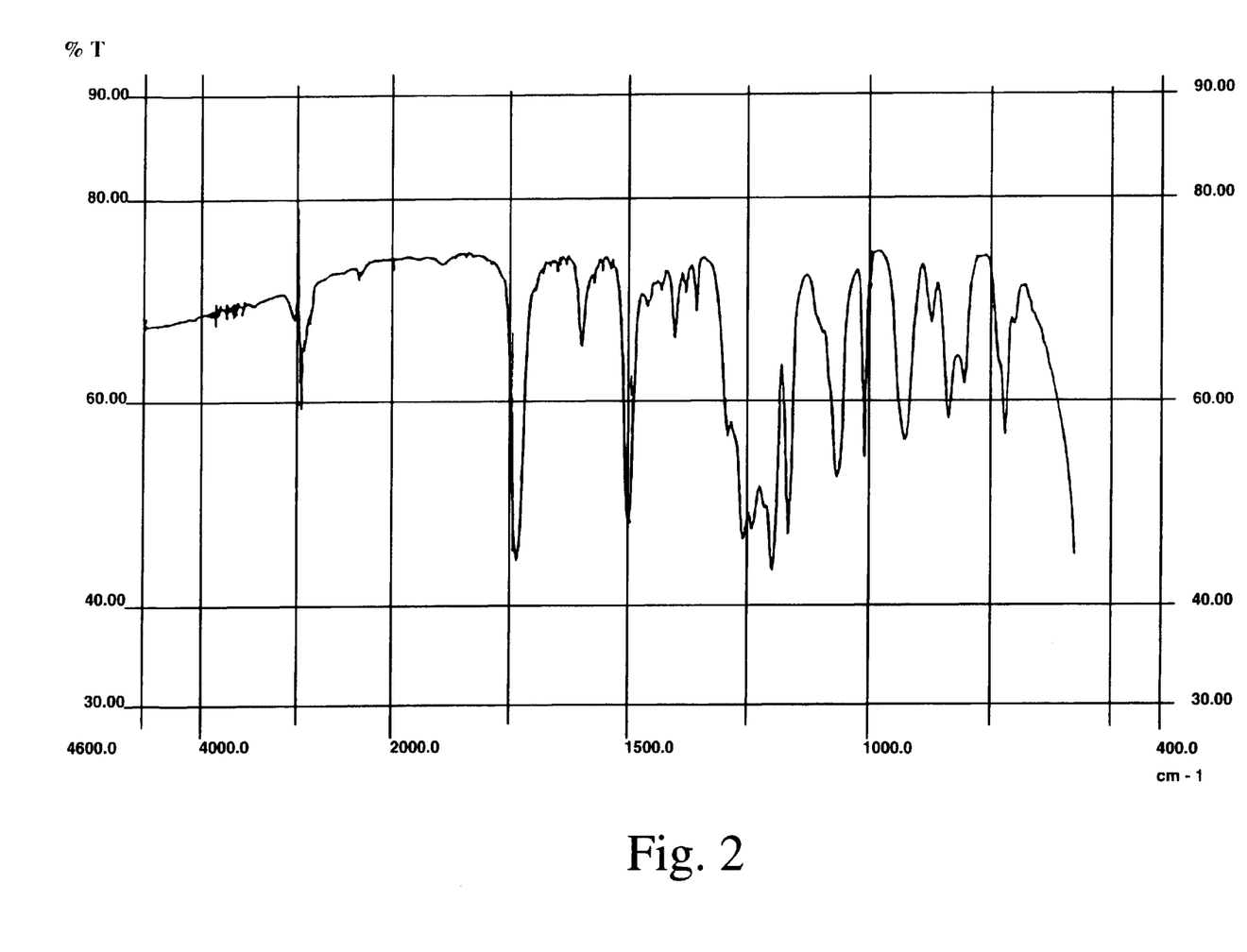
FIG. 2 is a graph showing of IR spectrum of the polyester-siloxane copolymer obtained in Example 1.

Next, the IR spectrum of the polymer obtained is shown in FIG. 2. The Si—O bond of the polydimethylsiloxane starting material shows a large absorption at 1110–1000 $cm^{-1}$, but such an absorption was hardly found in the IR spectrum of the polymer obtained. Instead of this, an absorption at 940 $cm^{-1}$ attributable to Si—O originated from the bond O—Si—R (an aromatic group) was confirmed. The polycarbonate as a starting material shows an absorption at 1775 $cm^{-1}$ attributable to carbonyl (C=O), while such an absorption did not exist in the IR spectrum of the polymer obtained and an absorption at 1740 $cm^{-1}$ attributable to C=O originated from carbonyl (C=O) of ester was confirmed. All the facts mentioned above show that the polymer obtained was a polyester-siloxane copolymer and had the structural unit represented by the above-described general formula (IV).

The evaluation for the properties of the polymer obtained are shown in Table 1.

Example 2

The procedures of Example 1 were repeated except that 1720 g (5 mol) of bis(methyl carbonate) from bisphenol A was used instead of polycarbonate. It was shown that the polymer obtained was a polyester-siloxane copolymer by the same analysis method as Example 1.

The evaluation for the properties of the polymer obtained are shown in Table 1.

Example 3

The procedures of Example 1 were repeated except that 180 g (1.5 mol) of dimethoxydimethylsilane (made by Tokyo Chem. Ind. Co., Ltd.) was used instead of polydimethylsiloxane. It was shown that the polymer obtained was a polyester-siloxane copolymer by the same analysis method as Example 1.

The evaluation for the properties of the polymer obtained are shown in Table 1.

Example 4

The procedures of Example 1 were repeated except that 740 g (repeating unit 10 mol) of polydimethylsiloxane and 971 g (5 mol) of dimethyl terephthalate were used but that dimethyl isophthalate was not used. It was shown that the polymer obtained was a polyester-siloxane copolymer by the same analysis method as Example 1.

The evaluation for the properties of the polymer obtained are shown in Table 1.

Example 5

The procedures of Example 1 were repeated except that 654 g of polymethylphenylsiloxane (silicone oil KF54 made by Shin-Etsu Chemical Co., Ltd.) was used instead of polydimethylsiloxane. It was shown that the polymer obtained was a polyester-siloxane copolymer by the same analysis method as Example 1.

The evaluation for the properties of the polymer obtained are shown in Table 1.

Example 6

The procedures of Example 1 were repeated except that 582 g (3.0 mol) of dimethyl terephthalate and 111 g (repeating unit 1.5 mol) of polydimethylsiloxane were used but that dimethyl isophthalate was not used.

Figure 3:
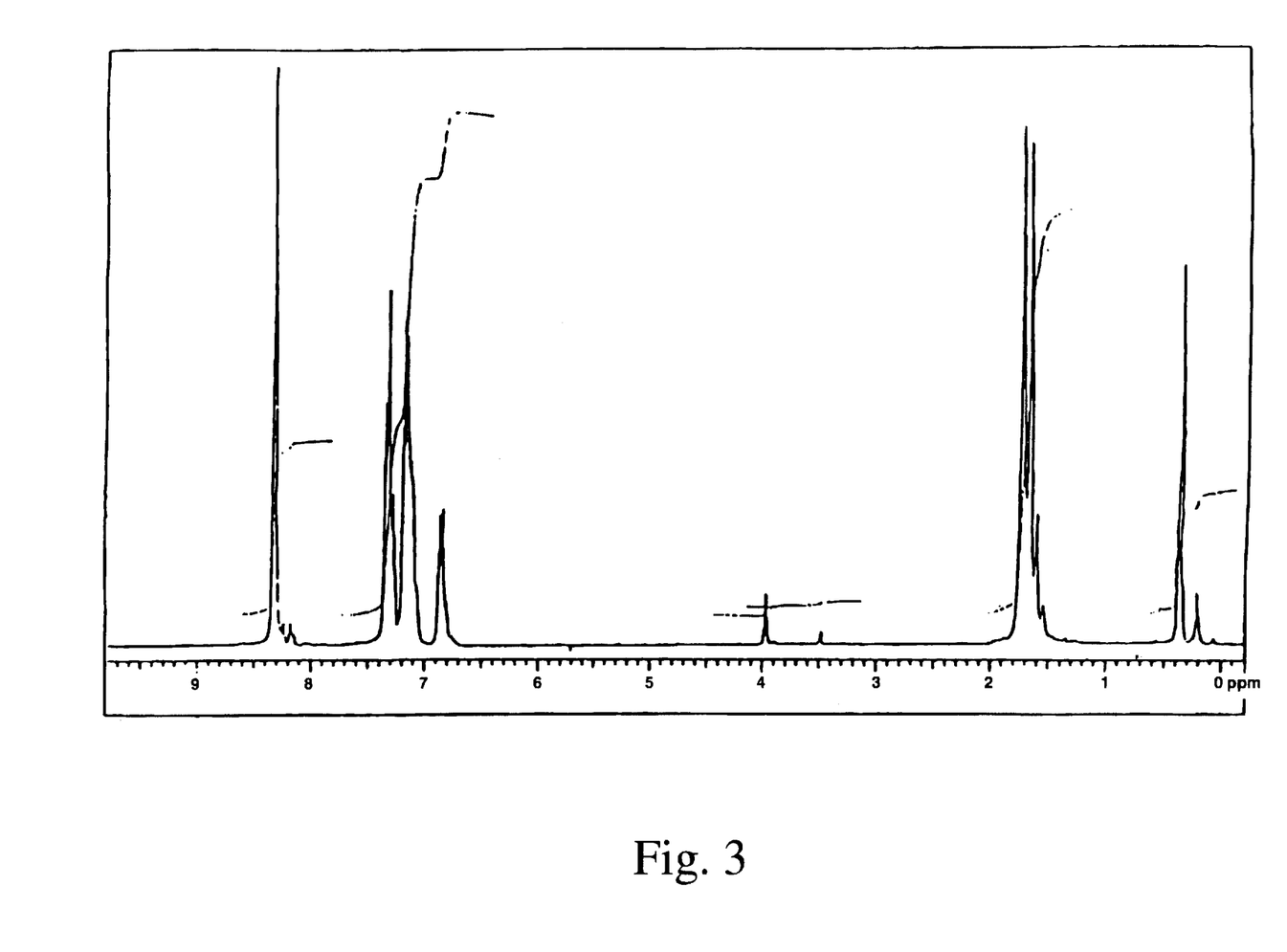
FIG. 3 is a graph showing of NMR spectrum of the polyester carbonate-siloxane copolymer obtained in Example 5.

The $^1$H-NMR spectrum of the polymer obtained is shown in FIG. 3. As shown in Example 1, a peak based on the polydimethylsiloxane starting material was not found, and two peaks at δ 0.18 ppm and δ 0.33 ppm were confirmed. These peaks correspond to a proton of a methyl group bonded to a silicon atom in a siloxane unit wherein a=2 and a=1 respectively in the structural unit represented by the above-described general formula (IV). In other words, this shows that a siloxane unit did not form a block and existed at random in the polymer chain. The silicon (Si) atom content calculated from $^1$H-NMR spectrum was 2.5% by weight, while the silicon atom content obtained from ICP emission spectrometer analysis method after the alkali fusion of the polymer was 2.5% by weight. Thus, it was shown that both values were the same.

Figure 4:
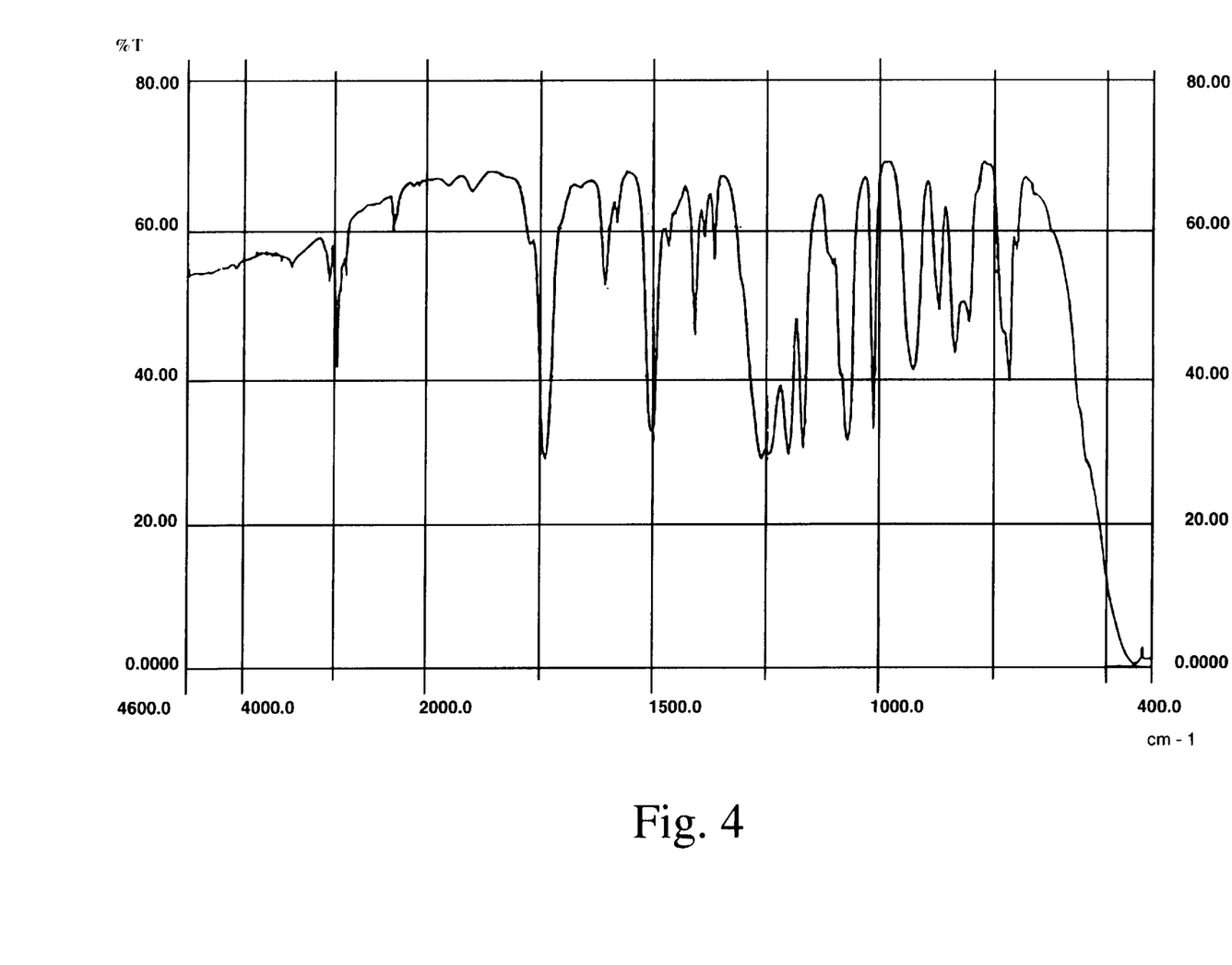
FIG. 4 is a graph showing of IR spectrum of the polyester carbonate-siloxane copolymer obtained in Example 5.

Next, the IR spectrum of the polymer obtained is shown in FIG. 4. In the polymer obtained, the absorption attributable to Si—O bond of polydimethylsiloxane was hardly found, as shown in Example 1. Instead of this, an absorption at 940 $cm^{-1}$ attributable to Si—O originated from the bond O—Si—R (an aromatic group) was confirmed. The polycarbonate starting material showed an absorption at 1775 $cm^{-1}$ attributable to carbonyl (C=O), while an absorption at 1740 $cm^{-1}$ attributable to C=O originated from the carbonyl (C=O) of the ester in addition to the absorption mentioned-above was found in the IR spectrum of the polymer obtained. The above-mentioned facts support that the polymer obtained was a polyester carbonate-siloxane copolymer and had the structural unit represented by the above-mentioned general formula (IV).

The evaluation for the properties of the polymer obtained are shown in Table 1.

Example 7

The procedures of Example 6 were repeated except that 59 g (repeating unit 0.8 mol) of polydimethylsiloxane was used. It was shown that the polymer obtained was a polyester carbonate-siloxane copolymer by the same analysis method as Example 6.

The evaluation for the properties of the polymer obtained are shown in Table 1.

Example 8

The procedures of Example 6 were repeated except that 180 g (1.5 mol) of dimethoxydimethylsilane was used instead of polydimethylsiloxane. It was shown that the polymer obtained was a polyester carbonate-siloxane copolymer by the same analysis method as Example 6.

The evaluation for the properties of the polymer obtained are shown in Table 1.

Example 9

The procedures of Example 6 were repeated except that 164 g of polymethylphenylsiloxane was used instead of polydimethylsiloxane. It was shown that the polymer obtained was a polyester carbonate-siloxane copolymer by the same analysis method as Example 6.

The evaluation for the properties of the polymer obtained are shown in Table 1.

Example 10

The procedures of Example 6 were repeated except that 291 g (1.5 mol) of dimethyl terephthalate and 291 g (1.5 mol) of dimethyl isophthalate were used instead of dimethyl terephthalate. It was shown that the polymer obtained was a polyester carbonate-siloxane copolymer by the same analysis method as Example 6.

The evaluation for the properties of the polymer obtained are shown in Table 1.

Example 11

The procedures of Example 6 were repeated except that 367 g (1.5 mol) of dimethoxydiphenylsilane (made by Tokyo Chem. Inc. Co., Ltd.) was used instead of polydimethylsiloxane. It was shown that the polymer obtained was a polyester carbonate-siloxane copolymer by the same analysis method as Example 6.

The evaluation for the properties of the polymer obtained are shown in Table 1.

Example 12

The procedures of Example 6 were repeated except that 450 g (5.0 mol) of dimethylcarbonate was used and that dimethyl terephthalate was not used.

Figure 5:
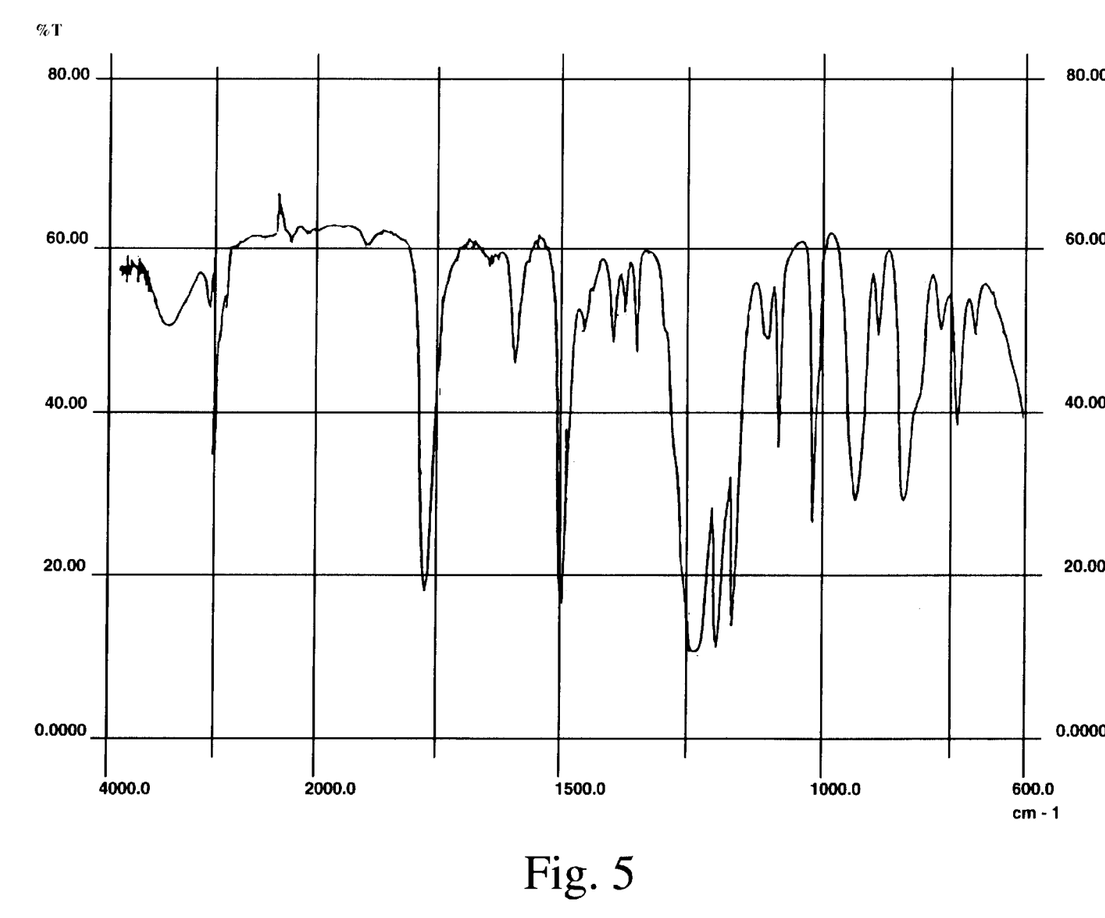
FIG. 5 is a graph showing of IR spectrum of the polycarbonate-siloxane copolymer obtained in Example 11.

Next, the IR spectrum of the polymer obtained is shown in FIG. 5. In the polymer obtained, an absorption at 940 $cm^{-1}$ attributable to Si—O originated from the O—Si—R (an aromatic group) bond was confirmed. Furthermore, an absorption at 1775 $cm^{-1}$ attributable to C=O, which originated from the carbonate bond, was found. Silicon atom content obtained from ICP emission spectrometer analysis method after alkali fusion of the polymer was 3.1% by weight. These results show that the polymer obtained was a polycarbonate-siloxane copolymer.

The evaluation for the properties of the polymer obtained are shown in Table 1.

Example 13

The procedures of Example 12 were repeated except that dimethylcarbonate was not used. It was shown that the polymer obtained was a polycarbonate-siloxane copolymer by the same analysis method as Example 12.

The evaluation for the properties of the polymer obtained are shown in Table 1.

Example 14

The procedures of Example 12 were repeated except that 180 g (1.5 mol) of dimethoxydimethylsilane was used instead of polydimethylsiloxane. It was shown that the polymer obtained was a polycarbonate-siloxane copolymer by the same analysis method as Example 12.

The evaluation for the properties of the polymer obtained are shown in Table 1.

Example 15

The procedures of Example 12 were repeated except that 163 g of polymethylphenylsiloxane was used instead of polydimethylsiloxane and that dimethylcarbonate was not used. It was shown that the polymer obtained was a polycarbonate-siloxane copolymer by the same analysis method as Example 12.

The evaluation for the properties of the polymer obtained are shown in Table 1.

Example 16

The procedures of Example 12 were repeated except that 367 g (1.5 mol) of dimethoxydiphenylsilane was used instead of polydimethylsiloxane and that dimethylcarbonate was not used. It was shown that the polymer obtained was a polycarbonate-siloxane copolymer by the same analysis method as Example 12.

The evaluation for the properties of the polymer obtained are shown in Table 1.

Example 17

The procedures of Example 12 were repeated except that 720 g (6.0 mol) of dimethoxydimethylsilane was used instead of polydimethylsiloxane and that dimethylcarbonate was not used.

It was shown that the polymer obtained was a polyolsiloxane copolymer because an absorption at 1775 $cm^{-1}$ attributable to C=O, which originated from carbonate bond, was not found in the IR spectrum of the polymer obtained.

The evaluation for the properties of the polymer obtained are shown in Table 1. The ratios of the ingredients in each starting materials of the polymer obtained in the abovementioned Example 1–17 are shown in Table 2.

Example 18

30 parts by weight of the each polymer obtained in Examples 1 and 6 was added to 100 parts by weight of commercially available polycarbonate resin (Pan light L-1250 made by Teijin Chem. Ind. Co., Ltd.) and melted and kneaded with a double screw extruder (LABOTEX made by Japan Steel Works Co., Ltd.) to give a pellet-like resin composition of each polymer. ⅛ inches samples were made by injecting these resin compositions, and fire retardance was evaluated respectively. When the evaluation according to UL-94V standard was performed, V-2 was obtained for commercially available polycarbonate resin alone, while V-0 was obtained for both resin compositions obtained in Example 1 and 6.

From results obtained above, it has been confirmed that the siloxane copolymer of the invention also has a superior performance as a fire retardant.

Comparative Example 1

The evaluation for the properties of a commercially available polycarbonate resin (Pan light L-1250 made by Teijin Chem. Ind. Co., Ltd.) are shown in Table 1 as the Comparative Example.

From the results obtained above, it can be seen that the siloxane copolymer of the invention has the same superior transparency as polycarbonate resin and has been remarkably improved in fire retardance compared with polycarbonate resin.

TABLE 1

Properties of Siloxane Copolymer of Each Example

| | Mw | amount of Si (% by weight) | Tg (° C.) | MV (poise) | fire retardance[1] | T (%) |
|---|---|---|---|---|---|---|
| Example 1 | 58000 | 3.4 | 123 | 500 | V-0 | 89 |
| Example 2 | 62000 | 3.3 | 125 | 2000 | V-0 | 90 |
| Example 3 | 60000 | 2.1 | 137 | 5000 | V-0 | 88 |
| Example 4 | 73000 | 4.9 | 151 | 9000 | V-0 | 88 |
| Example 5 | 64000 | 3 | 148 | 7000 | V-0 | 87 |
| Example 6 | 59000 | 2.5 | 141 | 7000 | V-0 | 87 |
| Example 7 | 75000 | 1.1 | 160 | 13000 | V-0 | 89 |
| Example 8 | 62000 | 2.4 | 142 | 7000 | V-0 | 88 |
| Example 9 | 64000 | 2.3 | 150 | 9000 | V-0 | 87 |
| Example 10 | 74000 | 2.6 | 123 | 3000 | V-0 | 88 |
| Example 11 | 54000 | 2.6 | 155 | 10000 | V-0 | 86 |
| Example 12 | 50000 | 3.1 | 92 | — | — | 90 |
| Example 13 | 48000 | 0.9 | 130 | — | — | 87 |
| Example 14 | 58000 | 3.1 | 92 | — | — | 89 |
| Example 15 | 58000 | 2.5 | 117 | — | — | 88 |
| Example 16 | 52000 | 2.7 | 120 | — | — | 89 |
| Example 17 | 54000 | 9.8 | 70 | — | — | 89 |
| Comparative Example 1 | 62000 | — | 147 | 6000 | not V | 90 |

[1] A evaluation according to UL-94 standard (using 1/16 inches sample)

TABLE 2

Ratio of Starting Materials of Siloxane Copolymer in Each Example

| example | (A) poly-carbonate or dicarbonate of diol — repeating unit of polycarbonate (mol) | (B) diester of dicarboxylic acid — dimethyl terephthalate (mol) | (B) diester of dicarboxylic acid — dimethyl isophthalate (mol) | (C) Si compound — poly-dimethyl siloxane (mol) | (C) Si compound — di-methoxy dimethyl silane (mol) | (C) Si compound — poly-methyl phenyl siloxane (mol) | (C) Si compound — di-methoxy diphenyl silane (mol) | ratio of the charge amount B/A | ratio of the charge amount C/A | produced polymer |
|---|---|---|---|---|---|---|---|---|---|---|
| 1 | 5 | 2.5 | 2.5 | 6 | | | | 1 | 1.2 | polyester |
| 2 | 5[1] | 2.5 | 2.5 | 6 | | | | 1 | 1.2 | — |
| 3 | 5 | 2.5 | 2.5 | | 1.5 | | | 1 | 0.3 | siloxane |
| 4 | 5 | 5 | | 10 | | | | 1 | 2 | |
| 5 | 5 | 2.5 | 2.5 | | | 6 | | 1 | 1.2 | |
| 6 | 5 | 3 | | 1.5 | | | | 0.6 | 0.3 | polyester |
| 7 | 5 | 3 | | 0.8 | | | | 0.6 | 0.15 | — |
| 8 | 5 | 3 | | | 1.5 | | | 0.6 | 0.3 | carbonate |
| 9 | 5 | 3 | | | | 1.5 | | 0.6 | 0.3 | — |
| 10 | 5 | 1.5 | 1.5 | 1.5 | | | | 0.6 | 0.3 | siloxane |
| 11 | 5 | 3 | | | | | 1.5 | 0.6 | 0.3 | |
| 12 | 5 | | | 1.5 | | | | | 0.3 | poly-carbonate |
| 13 | 5 | | | 1.5 | | | | | 0.3 | carbonate |
| 14 | 5 | | | | 1.5 | | | | 0.3 | — |
| 15 | 5 | | | | | 1.5 | | | 0.3 | siloxane |
| 16 | 5 | | | | | | 1.5 | | 0.3 | |
| 17 | 5 | | | 6 | | | | | 1.2 | polyol-siloxane |

[1] Dicarbonate of diol was used.

Possible Industrial Applicability

The siloxane random copolymer of the invention is superior in fire retardance, transparency, moldability, mold releasing property and surface lubricating property, and it is especially superior in fire retardance while maintaining the other superior properties. Accordingly, the siloxane random copolymer of the invention is useful in particular for articles in which heat resistance is required. The siloxane random copolymer of the invention is useful as a chief ingredient in a fire retardant resin composition or a resin composition for molding and also useful as a fire retardant to improve fire retardance of other resins.

Accordingly, the siloxane random copolymer, the fire retardant resin composition and the resin composition for molding of the invention are especially suitable for an article, for example, in the field of electricity, illumination and automobiles.

Furthermore, a siloxane copolymer can be produced simply, easily and cheaply by the process of the invention.

What is claimed is:

1. A siloxane random copolymer having a repeating unit represented by the following general formula (I), (II) and (III) at random:

(general formula I)

wherein: a is 1 or 2; $R^1$ and $R^2$ are independently a hydrogen atom or a hydrocarbon group of carbon number 1–20, wherein some or all of the hydrogen atoms in these hydrocarbon groups can be substituted with halogen atoms independently; $R^3$ is a divalent hydrocarbon group of carbon number 1–20, wherein some or all of the hydrogen atoms in these hydrocarbon groups can be substituted with halogen atoms independently, or a group represented by —$R^5$—X—$R^6$— wherein each of $R^5$ and $R^6$ is a divalent aromatic hydrocarbon group, wherein one or more of the hydrogen atoms on the aromatic rings may be substituted with a halogen atom, a hydrocarbon group, an alkoxy group or a phenoxy group independently; X is a single bond, —O—, —S—, —SO—, —SO₂—, —CO— or a divalent hydrocarbon group of carbon number 1–20;

(general formula II)

wherein: b is 0 or 1, provided that if c in general formula III is 0, then b is 1; $R^3$ is the same as defined above;

(general formula III)

wherein: c is 0 or 1, provided that if b in general formula II is 0, then c is 1; $R^3$ is the same as defined above; $R^4$ is a divalent hydrocarbon group of carbon number 1–20, wherein some or all of the hydrogen atoms in these hydrocarbon groups can be substituted with halogen atoms independently, or a group represented by —$R^5$—X—$R^6$— wherein $R^5$ and $R^6$ are the same as defined above; X is the same as defined above.

2. The copolymer according to claim 1 wherein said copolymer has structural units represented by general formula (IV) and each structural unit in the copolymer can be the same or different:

(general formula IV)

wherein: a is the same as defined in claim 1; d is 0 or 1; 1 is an integer of one or more; m is an integer of one or more; n is an integer of one or more; $R^1$, $R^2$, $R^3$ and $R^4$ are the same as defined in claim 1.

3. The copolymer according to claim 1 wherein the weight average molecular weight of said copolymer is in the range of 2000–300000.

4. The copolymer according to claim 1 wherein $R^1$ and $R^2$ are independently a methyl or a phenyl group.

5. The copolymer according to claim 1 wherein $R^3$ is a group derived from 2,2-bis(4-hydroxyphenyl)propane or 1,1-bis(4-hydroxyphenyl)-3,3,5-trimethylcyclohexane.

6. The copolymer according to claim 1 wherein $R^4$ is a group derived from a dicarboxylic acid selected from the group consisting of terephthalic acid, isophthalic acid, 1,4-naphthalene dicarboxylic acid, 1,5-naphthalene dicarboxylic acid, 2,6-naphthalene dicarboxylic acid, 2,7-naphthalene dicarboxylic acid, 1,4-cyclohexanedicarboxylic acid, 1,3-cyclohexanedicarboxylic acid, 1,2-cyclohexanedicarboxylic acid, 1,4-decahydronaphthalenedicarboxylic acid, 1,5-decahydronaphthalenedicarboxylic acid, 2,6-decahydronaphthalenedicarboxylic acid and 2,7-decahydronaphthalenedicarboxylic acid.

7. A fire retardant resin composition containing the copolymer according to claim 1.

8. A resin composition for molding containing the copolymer according to claim 1.

9. A process of producing a siloxane random copolymer comprising the step of reacting at least one polycarbonate and/or dicarbonate of a diol with at least one silicon compound in the presence of an esterifying or ester exchange catalyst, at a reaction temperature of 250° C. to 350° C., wherein said silicon compound is represented by the general formulas (V) and/or (VI):

(general formula V)

(general formula VI)

wherein e is an integer of 0–5000; f is an integer of 3–20; $R^7$, $R^8$, $R^9$, $R^{10}$, Y and Z are a hydrogen atom or a hydrocarbon group of carbon number 1–20, a hydroxyl group, a halogen atom, an alkoxy group, a phenoxy group, an amino group, a group containing an ammonium salt, an alkyl amino group, a carboxyl group, an ester group, a polyether group, an epoxy group, a vinyl group, a vinylether group, a vinylester group, an allyl group, an acryl group, a methacrylic group, a mercapto group, or an isocyanate group independently, wherein some or all of the hydrogen atoms in these hydrocarbon groups can be substituted independently with at least one group selected from a group consisting of a hydroxyl group, a halogen atom, an alkoxy group, a phenoxy group, an amino group, a group containing an ammonium salt, an alkyl amino group, a carboxyl group, an ester group, a polyether group, an epoxy group, a vinyl group, a vinylether group, a vinylester group, an allyl group, an acryl group, a methacrylic group, a mercapto group, or an isocyanate group.

10. The process according to claim 9 wherein the polycarbonate is represented by a general formula (VII):

(general formula VII)

wherein g is an integer of 10000 or less; $R^3$ is a divalent hydrocarbon group of carbon number 1–20, wherein some or all of the hydrogen atoms in these hydrocarbon groups can be substituted with halogen atoms independently, or a group represented by —$R^5$—X—$R^6$— wherein each of $R^5$ and $R^6$ is a divalent aromatic hydrocarbon group, wherein one or more of the hydrogen atoms on the aromatic rings may be substituted with a halogen atom, a hydrocarbon group, an alkoxy group or a phenoxy group independently; X is a single bond, —O—, —S—, —SO—, —SO₂—, —CO— or a divalent hydrocarbon group of carbon number 1–20.

11. The process according to claim 9 wherein the dicarbonate of a diol is represented by a general formula (VIII):

(general formula VIII)

wherein R³ is a divalent hydrocarbon group of carbon number 1–20, wherein some or all of the hydrogen atoms in these hydrocarbon groups can be substituted with halogen atoms independently, or a group represented by —R⁵—X—R⁶— wherein each of R⁵ and R⁶ is a divalent aromatic hydrocarbon group, wherein one or more of the hydrogen atoms on the aromatic rings may be substituted with a halogen atom, a hydrocarbon group, an alkoxy group or a phenoxy group independently; X is a single bond, —O—, —S—, —SO—, —SO₂—, —CO— or a divalent hydrocarbon group of carbon number 1–20; R¹¹ is a hydrocarbon group of carbon number 1–20.

12. The process according to claim 9 further comprising the step of reacting at least one diester of dicarboxylic acid wherein said diester of dicarboxylic acid is represented by general formula (IX):

(general formula IX)

wherein R⁴ is a divalent hydrocarbon group of carbon number 1–20, wherein some or all of the hydrogen atoms in these hydrocarbon groups can be substituted with halogen atoms independently, or a group represented by —R⁵—X—R⁶— wherein each of R⁵ and R⁶ is a divalent aromatic hydrocarbon group, wherein one or more of the hydrogen atoms on the aromatic rings may be substituted with a halogen atom, a hydrocarbon group, an alkoxy group or a phenoxy group independently; X is a single bond, —O—, —S—, —SO—, —SO₂—, —CO— or a divalent hydrocarbon group of carbon number 1–20; R¹¹ is a hydrocarbon group of carbon number 1–20.

13. The process according to claim 9 wherein said silicon compound is selected from the group consisting of polydimethylsiloxane, polymethylphenylsiloxane, dimethoxydimethylsiloxane, dimethoxydiphenylsiloxane, octamethylcyclotetrasiloxane and octaphenylcyclotetrasiloxane.

14. The process according to claim 9 wherein the polycarbonate is a polycarbonate of 2,2-bis(4-hydroxyphenyl)propane.

15. The process according to claim 9 wherein the bicarbonate of diol is selected from the group consisting of the bis(methyl carbonate) of 2,2-bis(4-hydroxyphenyl)propane and the bis(phenyl carbonate) of 2,2-bis(4-hydroxyphenyl)propane.

16. The process according to claim 12 wherein the diester of dicarboxylic acid is selected from the group consisting of dimethyl terephthalate, dimethyl isophthalate and dimethyl 2,6-naphthalene-dicarboxylate.

17. The process according to claim 9 wherein the esterifying or ester exchange catalyst is a tin compound.

18. The process according to claim 9 wherein the esterifying or ester exchange catalyst is at least one selected from the group consisting of an acetate, a carbonate, a borate, an oxide, a hydroxide, a hydride, an alcoholate and a phenolate of lithium, sodium, potassium, magnesium, calcium, barium, strontium, zinc, cadmium, titanium, zirconium, tin, antimony, lead, manganese and cobalt.

19. The process according to claim 9 wherein 0.0001–1 parts by weight of the esterifying or ester exchange catalyst is used to 100 parts by weight of the siloxane copolymer obtained.

20. The process according to claim 9, wherein the reaction temperature is 280° C. to 350° C.

21. The copolymer according to claim 1, wherein c is 1.

22. The copolymer according to claim 1 wherein a is predominantly 1 or 2.

* * * * *